July 19, 1960  M. P. SCHULTZ ET AL  2,945,356
REFRIGERATED MILK STORAGE TANK
Filed Aug. 15, 1958  5 Sheets-Sheet 1

INVENTORS
Melvin P. Schultz
Paul L. Luxem
BY George E. Mussey
Ooms, McDougall, Williams & Horsh
Attorneys Melvin P. Schultz
Paul L. Luxem
George E. Mussey
INVENTORS

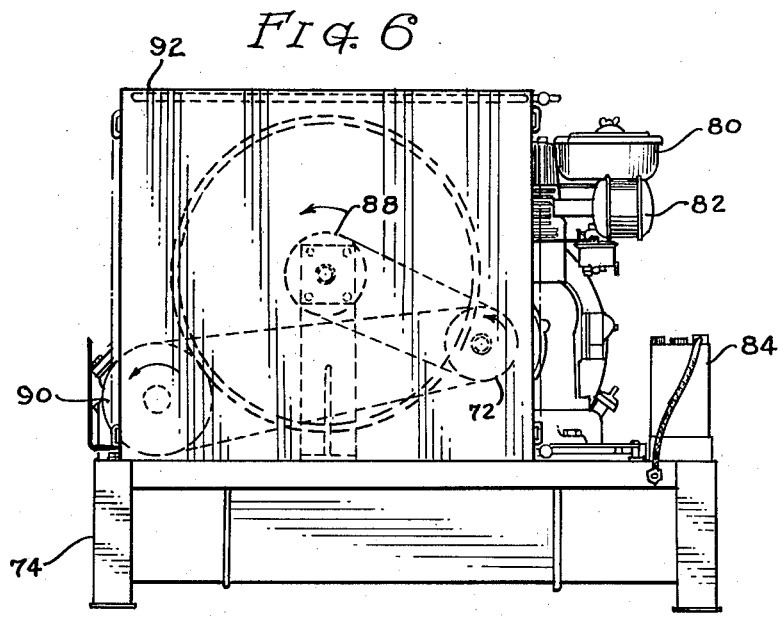
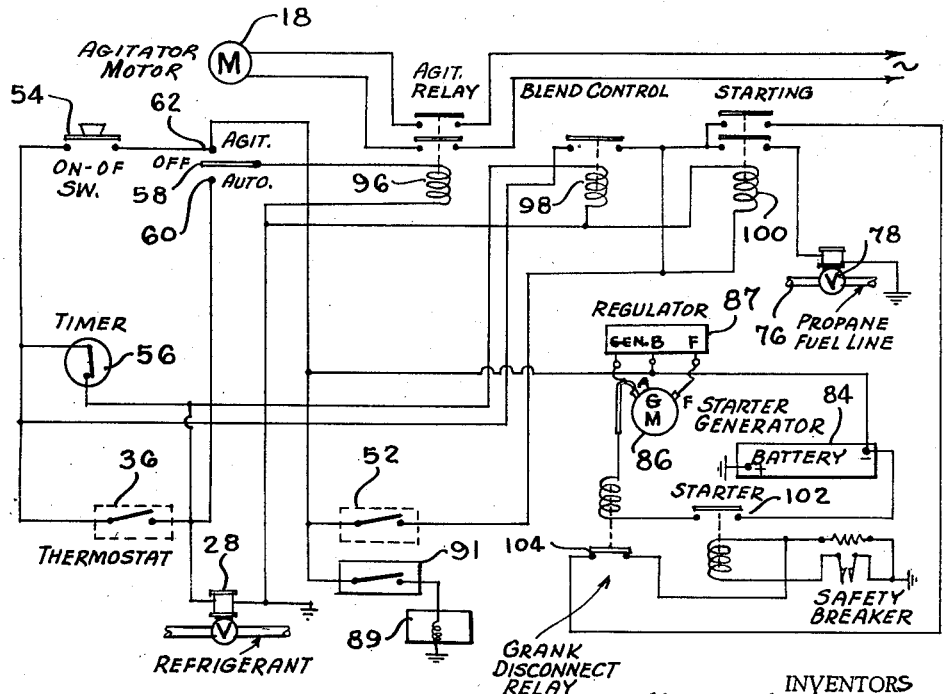

United States Patent Office 2,945,356
Patented July 19, 1960

2,945,356
REFRIGERATED MILK STORAGE TANK

Melvin P. Schultz, Paul L. Luxem, and George E. Mussey, Tomahawk, Wis., assignors to U.S. Industries, Inc., New York, N.Y., a corporation of Delaware Filed Aug. 15, 1958, Ser. No. 755,302
5 Claims. (Cl. 62—157)

This is a continuation-in-part of patent application No. 652,871, filed April 15, 1957, and results from a requirement for division in that application.

This invention relates to a refrigerating mechanism and, more particularly, to a refrigerating mechanism for a fluid storage container used in the collection and storage of perishable liquids such as milk.

Problems involved in the design of fluid storage containers suitable for the collection and storage of highly perishable fluids for human consumption are very severe. Milk is particularly perishable, and is accordingly more difficult to handle and store. One of the most difficult problems connected with its storage is the maintenance of the strict temperature controls which are necessary to prevent the milk from spoiling.

For example, milk should be cooled to a temperature below 50° F. within one hour after milking, since above that temperature milk deteriorates rapidly. To satisfy this requirement, appropriate temperature control mechanisms are built into the storage tank and its refrigerating mechanism.

Another problem associated with the handling of milk and the temperature control necessary for its storage is that after the milk in the refrigerated tank or container is reduced to the temperature determined by the setting on the temperature control mechanism, an additional quantity of fresh warm milk may be added. If at the time the fresh warm milk is added the temperature control mechanism has cut off the refrigerating mechanism, a considerable period of time might elapse before the liquid is mixed sufficiently to affect the temperature controls for initiating operation of the refrigerating mechanism. It could also happen that the temperature of the mixture may not immediately rise high enough to start the refrigeration cycle. This mixture of warm and cold milk is conducive to the growth of bacteria, so that refrigeration is desirable to avoid spoilage. Therefore, it is desirable to embody means for refrigeration to reduce the temperature of the added milk as soon as it is poured into the container, regardless of the milk temperature.

An added problem in the design of these refrigerating systems is that milk storage tanks must be washed frequently with hot cleaning solutions. This subjects the cooling coils in the tank to severe temperature changes which could produce damagingly high internal pressures.

What is needed, therefore, and comprises the principal object of this invention, is a storage tank for use in the collection and storage of a perishable fluid such as milk under controlled refrigerated conditions.

Another object of this invention is to provide a temperature control mechanism for the refrigerating system of a liquid storage tank which permits the refrigerating mechanism to start immediately upon the introduction of fresh warm milk, regardless of the temperature of the milk in the container.

Yet another object of this invention is to provide a mechanism for a refrigerating system which permits the refrigerating coils to withstand severe temperature changes during cleaning without producing damagingly high pressures inside them.

Still a further object of this invention is to provide a refrigerating system which is powered by an electric motor and a temperature control system which simultaneously controls both the operation of the refrigerating system and the operation of the electric motor.

Yet a further object of this invention is to provide a refrigerating system powered by a liquid petroleum-powered internal combustion engine, hereafter designated as an L.P. gas engine, and a temperature control system which simultaneously controls the refrigerating mechanism and the fuel supply to the engine.

Still another object of this invention is to provide a control system for a refrigerated tank which simultaneously starts and stops a refrigerating mechanism driven by an L.P. gas engine in accordance with temperature requirements inside the tank.

Yet another object of this invention is to provide a refrigerating mechanism having means for regulating the discharge pressure of the refrigerator compressor, regardless of the temperature of the ambient air.

These and other objects of this invention will become more apparent when read in the light of the accompanying specification and drawings wherein—

Figure 3:
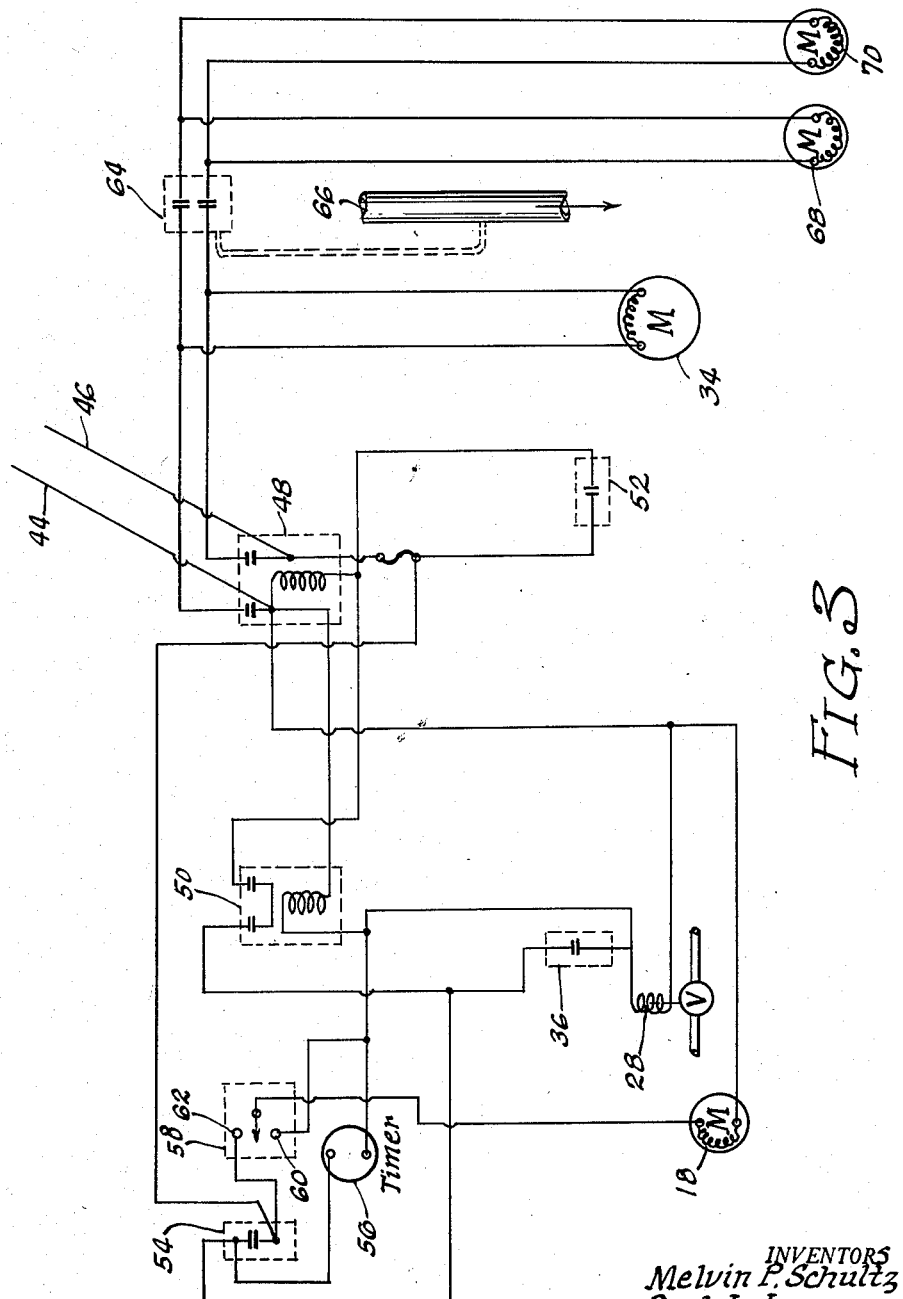
Figure 4:
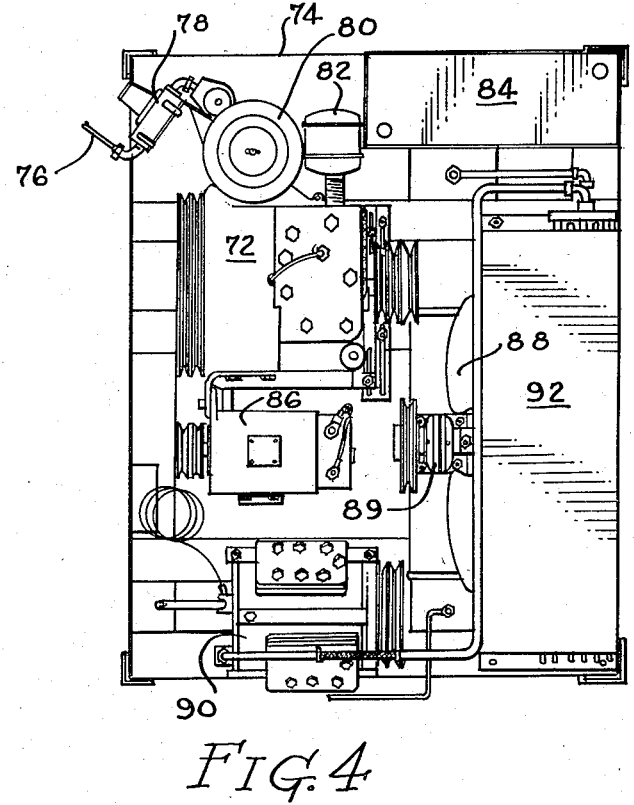
Figure 5:
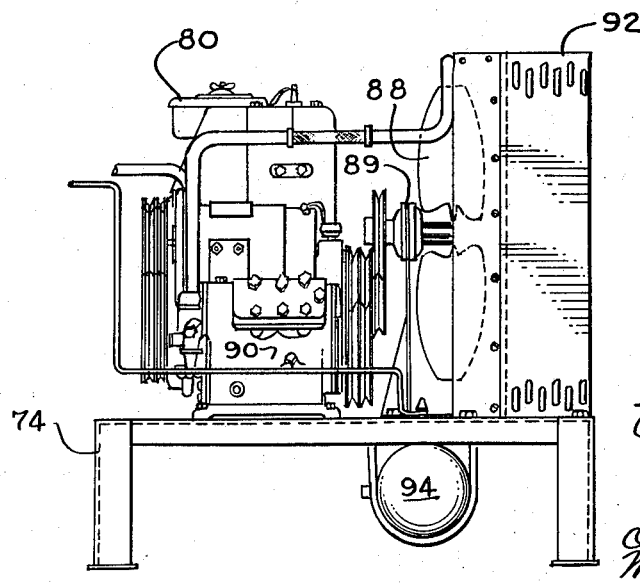

Figure 3 discloses the electronic control circuit for an embodiment of the refrigerating system powered exclusively by electricity;

Figure 4 is a plan view of one embodiment of this invention in which an L.P. gas engine is used to power the refrigerating system;

Figure 5 is a side view of the L.P. gas engine and associated mechanism disclosed in Figure 4;

Figure 6 discloses an end view of the refrigerating system shown in the embodiment of Figure 4; and Figure 7 discloses the electronic control circuit for simultaneously controlling the operation of the refrigerating mechanism and the operation of the L.P. gas engine in accordance with temperature changes inside the container.

Figure 1:
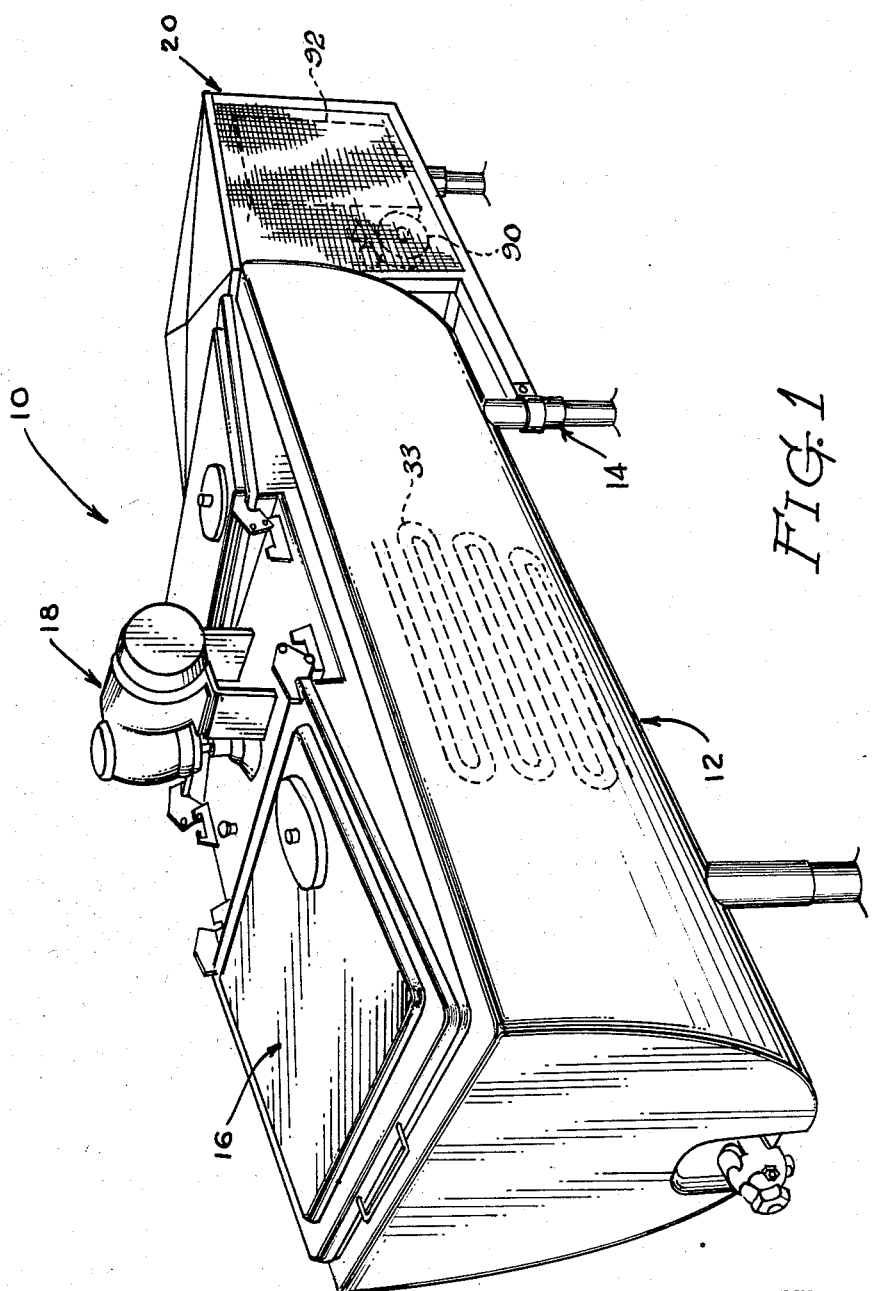
Figure 1 is a perspective view of the tank embodying the feature of this invention.

Referring now to Figure 1, the liquid storage container indicated generally as 10 comprises a tank portion indicated generally as 12, adjustable leg portions indicated generally as 14, a cover portion indicated generally as 16, and a mixing or agitating motor indicated generally as 18. The refrigerating mechanism, such as the compressors 90, condensers 92, etc., may be mounted in a housing 20 secured to the end of the container.

Figure 2:
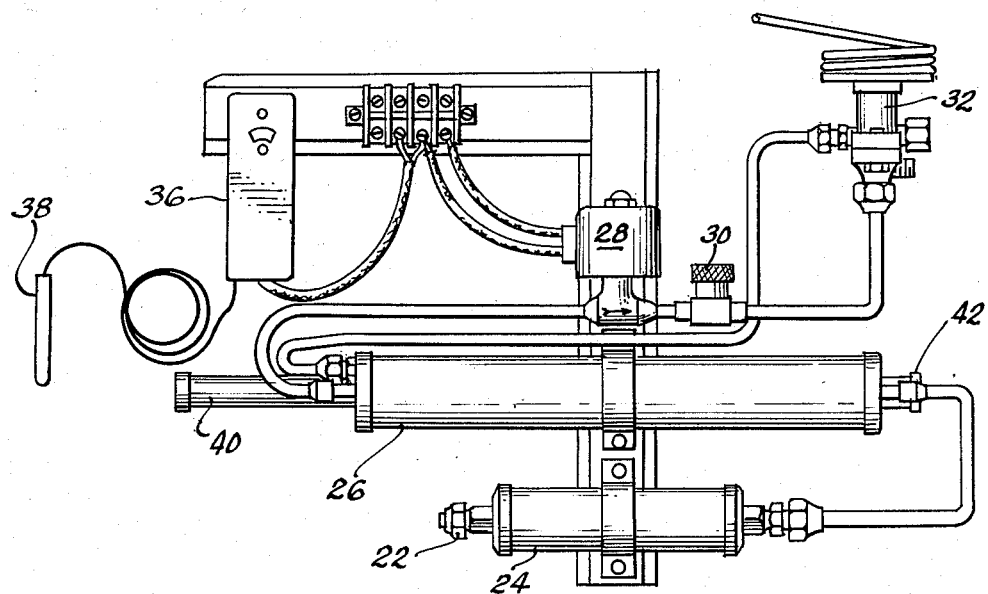
Figure 2 is a view of the refrigerating mechanism mounted on one end of the liquid storage tank.

A portion of the refrigerating apparatus is mounted on an end of the container. As seen in Figure 2, the Freon gas or other refrigerant, is pumped from the compressor 90 through the inlet coupling 22, and passes through the dryer 24. After the gas is dried it passes through the heat exchanger 26, and from there it goes through the solenoid valve 28 and the sight glass 30 to the thermo element-controlled expansion valve 32, in a manner well known in the art. This expansion valve 32 increases the amount of refrigerant entering the cooling coils 33 inside the container or tank 12, as the temperature there rises. The electric motor 34, for driving the compressor, in this embodiment, see Figure 3, is controlled by the low pressure switch 52 which in turn is controlled by the action of the solenoid valve 28. The solenoid valve is controlled by thermoswitch 36 and its temperature-sensing element 38. The expanded refrigerant leaves the cooling coils 33 inside the container and enters the heat exchanger 26 through the outlet pipe 40. Upon leaving the heat exchanger, the refrigerant goes back to the compressor through pipe 42.

The electrical control circuit for the refrigerating mechanism is shown in Figure 3. As seen, the power source, usually 220 volts A.C., is supplied through power lines 44 and 46. The solenoid switches 48 and 50 are normally open. The low pressure switch 52, which is designed to be closed when the pressure in the refrigerating lines rises, is also normally open. The on-off switch 54 and the timer switch 56 are also normally open. The agitator switch 58 is normally connected to terminal 60 for automatic operation of the agitator motor 18 with the refrigerating mechanism. Terminal 62 of the agitator switch 58 is for manual operation of the agitator motor as described below. The thermoswitch 36 is normally closed and is designed to open when the temperature in the tank or container 12 drops to a predetermined level.

In operation, closing switch 54 permits current to flow from power line 46 through the thermoswitch 36 and on through the solenoid valve 28, the agitator motor 18, and the relay coils 48 and 50. When relay 48 closes, the motor 34 starts and drives the compressor 90, causing it to pump refrigerant through the cooling coils 33 of the refrigerator in a manner well known in the art. When the temperature inside the container 10 drops to a predetermined value, the thermoswitch 36 opens, and this shuts off the agitator motor 18 and the solenoid valve 28, which cuts off the supply of refrigerant to the cooling coils or the evaporator plates of the container. It is noted, however, that the compressor motor 34 continues to operate for a time after the thermoswitch opens. This is because the low pressure switch 52, which was initially open, has closed as the pressure in the cooling coils rose due to the increase in suction line pressure caused by opening the solenoid valve. This switch, as seen in Figure 3, controls the operation of the motor compressor, permitting the motor 34 to continue to operate after the thermoswitch 36 is satisfied and the solenoid valve 28 is closed, thus causing the compressor to substantially evacuate the cooling coils of the tank. Then, as the pressure in these lines drops, the low pressure switch 52 again opens, cutting off the motor 34 and causing the compressor to stop. This arrangement is very important because its permits the interior of the container 12 to be washed with a hot cleaning solution without producing damagingly high pressures in the cooling coils 33. Washing is necessary when the tank or container is used to store milk, and the tank or container 12 must be hygienically cleaned at frequent intervals so that it is highly desirable to automatically remove the refrigerant from the coils in the container after each shutdown.

As stated above, the refrigerant is pumped out of the cooling coils 33 before the compressor is shut off, so that dangerous high pressures will not build up in the cooling coils when the tank is cleaned with hot solutions. There will, however, remain a small amount of refrigerant in the cooling coils despite the operation of the compressor, and so there will be a pressure rise in the cooling coils when the tank is being washed. It is noted, however, that before the pressure rise in the cooling coils becomes dangerously high, the pressure switch 52 will automatically close and start up the motor and operate the compressor to further pump down the cooling coils, until the pressure in them is below the cut-out setting of the low pressure switch 52. This is a very important safety feature and it gives the pressure switch 52 a double function in that it causes the compressor to automatically pump out most of the refrigerant from the cooling coils each time the refrigerating mechanism shuts down, and it acts as a pressure-regulating mechanism in that it automatically starts up the refrigerating mechanism to pump out the cooling coils when the pressure in them gets too high.

The agitator switch 58 has a manual position 62 for turning on the agitator motor 18 regardless of the operation of the refrigerating mechanism and the temperature inside the container. This is for maintaining a homogeneous distribution of the milk whenever samples of the milk are taken for determining its butterfat content. In addition, it maintains a uniform temperature throughout the mixture in the tank.

The timer switch 56 provides an additional important control. When fresh warm milk is added to milk already at its desired temperature in the container, the resulting increase in temperature inside the tank may not be sufficient to actuate the thermoswitch and start the refrigerating mechanism. Since bacteria thrive in mixtures of warm and cold milk, the milk in the tank could spoil unless the temperature of the mixture was promptly reduced. It is evident then, from an inspection of Figure 3, that the timer switch 56, when closed, by-passes the thermoswitch 36 and low pressure control switch 52 for a predetermined period of time. This makes it possible to turn on the refrigerating mechanism for at least one-half hour prior to the addition of warm milk to the milk in the container, so the milk in the container can be pre-cooled to provide a safe temperature when warm milk is mixed with the cold milk. In addition, it is possible to rapidly reduce the temperature of the fresh warm milk when it is added to the milk already in the container.

An additional pressure-regulating means for regulating the discharge pressure of the compressor 90 comprises a second pressure-controlled switch 64 which is connected to the compressor 90 through a pipe 66. This switch 64 controls the operation of condenser fans 68 and 70 which are directed against the condenser 92 in a manner well known in the art. This additional regulating means may be required for installations where the refrigerating mechanism is located in areas having ambient temperatures below 40° F. The switch 64 operates the fans to make the expansion valve 32 function in a normal manner at these low ambient temperatures. Without this control at low ambient temperatures, the condenser fans 68 and 70 would keep the compressor discharge pressure so low that there would not be a sufficient pressure differential to enable the expansion valve 32 to function properly. This means that even though the compressor is operating, there will be very little refrigeration. By having the pressure-controlled switch 64 cut out the fans, the pressure on the discharge side of the compressor 90 can be built up sufficiently, despite a low ambient temperature, to permit proper operation of the expansion valve. When the pressure on the discharge side of the compressor builds up to the cut-in setting on pressure switch 64, the fans will start operation to cool the refrigerant in a normal manner. In case the refrigerant is cooled too much so that the pressure in the discharge side of the compressor drops below the cut-out setting of the switch 64, the fans will automatically shut off until the pressure is built up to the cut-in setting and the proper pressure differential between the suction and discharge sides of the compressor for operation of the expansion valve is obtained. A typical setting of this switch could be 120 pounds per square inch cut-in pressure and 90 pounds per square inch cut-out pressure. This arrangement may be used with a single or double pole switch operating one or two fans.

The above-described refrigerated milk tank is designed to be used where an adequate supply of electricity exists. Many rural areas, however, which require refrigerated milk tanks for storing milk, are situated where there is no source of public power, or where the available electricity is insufficient to operate the refrigerating mechanism. Accordingly, the modification disclosed in Figures 4–7 shows a refrigerated milk tank in which the refrigerating mechanism is powered by an L.P. gas engine. As seen in Figure 4, this engine 72 is mounted on a support platform 74. The L.P. gas engine, its platform, and all associated mechanism described below, are adapted to be mounted in the housing 20, as shown in Figure 1, or in a similar housing located outside the milk-house.

The liquid petroleum fuel enters the engine 72 through a fuel line 76 and passes through a fuel regulator which includes a solenoid valve 78. From there the fuel is mixed with air passing through the air filter 80 in a manner well known in the art, and enters the engine for combustion. The combustion products leave the engine through exhaust 82.

A storage battery 84 is mounted on support 74 and has two functions. It is used to start the engine, and it acts to power the control system for the refrigerating mechanism when the engine 72 is shut down, as described below. When the engine 72 is operating, the function of the battery is supplanted by the combined starter motor and generator 86, which is also mounted on support 74. The motor 72 and the starter generator 86 are connected together by means of the usual pulley and belt linkage, as shown in Figures 4, 5, and 6.

In operation to this point, the starter generator 86 can be connected to the battery 84 so that it acts as a motor and drives engine 72 until it starts. After engine 72 has started, it drives the starter generator 86 so that it acts as a generator and supplies the electrical power necessary to operate the refrigerator control system.

Engine 72 is also connected to and drives a cooling fan 88 and the refrigerator compressor 90 by means of the usual pulley and belt linkage system, shown in dotted lines in Figure 6. As shown, the fan 88 is directed against the condenser 92 for cooling the compressed refrigerant leaving the discharge side of the compressor and before it enters the cooling coils 33 inside the tank 12. Suspended below the support 74 is the usual reservoir 94 for the refrigerant.

As described above in connection with the embodiment shown in Figures 1–3, means for regulating the discharge pressure of the compressor 90 and consequently governing the operation of the expansion valve 32 may be necessary where the tank is to be installed in areas where the ambient temperature is below 40° F. As shown, this involves controlling the operation of the cooling fan 88, and it may be done by connecting an electromagnetic clutch 89 between the pulley and the fan. This clutch would normally be engaged so that the fan 88 operates when the L.P. gas engine is operating. To cut off the fan, a normally closed pressure switch 91 may be provided, which is connected to the discharge side of the compressor in a manner well known in the art. The pressure switch is designed to open when low ambient temperatures reduce the discharge pressure of the compressor. As seen in Figure 7, when pressure switch 91 opens, the power to the electromagnetic clutch 89 is cut off, and this disconnects the fan 88 from engine 72. When the pressure on the discharge side of the compressor later increases beyond a predetermined value, the pressure switch 91 will again close to couple the fan to the engine, and thereby regulate the operation of the expansion valve.

When the L.P. gas engine 72 is operating and driving the compressor 90, the refrigerant, usually Freon gas, is pumped through the inlet coupling 22 and the rest of the refrigerating mechanism, shown in Figure 2. The electrical control circuit for the refrigerating mechanism powered by the L.P. gas engine and shown in Figure 7, is somewhat more complicated than the control system for the refrigerating mechanism powered by the electric motor shown in Figure 3, because the L.P. gas engine, in addition to driving the compressor 90, must also supply electricity for the control circuit. In addition, problems in automatically starting and stopping the L.P. gas engine are more complicated than those involve in starting and stopping an electric motor, and this is particularly true when the operation of the L.P. gas engine must be governed by the temperature inside the milk storage tank.

As seen in Figure 7, the control circuit is either powered by the battery 84 when the engine 72 is not running, or else it is powered by the starter generator 86 whose voltage output is governed by the regulator 87.

Initially the main control on-off switch 54 is closed. If at that time no refrigeration is required, then the timer switch 56 and the thermoswitch 36 are open. If it is desired to mix the milk before a sample is to be taken, or to maintain a uniform temperature throughout the mixture, the agitator switch is connected to terminal 62. Since engine 72 is shut down, a circuit-including battery 84 is completed through the agitator relay switch 58 causing it to close and connect a source of electric power, such as 220 volts to the agitator motor 18. This electric power may either be provided by public power lines or it may have to be provided by a small farm-operated generator.

If warm milk is to be added to the tank 12 in advance of a call by the thermoswitch 36, i.e., when the thermoswitch 36 is open, then the timer switch is closed, and its mechanism keeps it closed for a predetermined period. At the same time, the agitator switch 58 is connected to the automatic terminal 60. As seen, when the timer switch is closed, the thermoswitch is by-passed and the solenoid valve 28 is actuated and opens the refrigerant lines to let the refrigerant flow through the cooling coils 33 inside the tank. At the same time, the agitator relay 96 is closed, starting the agitator motor 18. In addition, the blend control relay 98 is closed. This closes the engine-starting relay 100, which in turn actuates the solenoid valve 78 in the fuel line, admitting fuel to the engine 72, and it closes the starter solenoid 102. When this happens, the starter generator 86 is powered by the battery 84 and drives the engine 72 fast enough to start it. After the engine has started, it drives the starter generator so it behaves like a generator and induces a reverse current which actuates the disconnect relay 104. This opens the starter solenoid 102 and prevents the generated voltage from short circuiting the battery voltage. With this arrangement, the control circuit is energized by the generated voltage instead of the battery 84, when engine 72 is operating.

After the engine 72 is operating and driving the compressor 90, the operation of the compressor will cause an increase in the pressure in the cooling or evaporator coils 33. This causes the pressure switch 52 to close. After the pressure switch 52 closes, it can be seen that even if both the timer switch 56 and the thermoswitch 36 are opened the L.P. gas engine would still continue to operate and drive the compressor. As described in connection with the all electric modification shown in Figures 1–3, the continued operation of engine 72 and the compressor 90 reduces the pressure in the cooling coils 33 so that when the milk storage tank 12 is cleaned with hot cleaning solution, the pressure rise in the cooling coils will not damage them.

The engine 72 and the compressor 90 will continue to operate after the thermoswitch 36 has opened and until the pressure in the cooling coils 33 drops below a predetermined value. When this happens, the pressure switch 52 will open, causing the starting relay 100 to open and shut off engine 72. Should the pressure in the cooling coils start to increase while the tank is being cleaned, the pressure rise will close the pressure switch 52, and this will cause engine 72 to start independently of the thermoswitch or the timer switch. The operation of the engine 72 will drive the compressor 90 and this will automatically reduce the pressure in the cooling coils 33 to a lower and safer value.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

We claim:

1. An apparatus of the class described comprising a storage tank, refrigerating means connected to said tank for cooling it, said refrigerating means including cooling coils mounted in said tank and a compressor, a L.P. gas engine connected to said compressor for driving it, a control circuit, said control circuit including a source of electric power and a thermoswitch, a portion of said thermoswitch comprising a temperature-sensing element mounted inside the tank, an electrical system for the L.P. gas engine, said electrical system including a starter motor connected to said L.P. gas engine, said control circuit connecting said starter motor to said power source when said thermoswitch is closed so that the starter motor is actuated and drives the L.P. gas engine to start it, said electrical system adapted to generate electric power when said L.P. gas engine is operating, means in said control circuit for automatically substituting the generated electrical power for the source of electric power to energize said control circuit when the L.P. gas engine is operating whereby the refrigerating mechanism and the L.P. gas engine may be controlled by the temperature in said tank, and means for by-passing the thermoswitch to permit the L.P. gas engine and the compressor to continue to operate after the thermoswitch has opened whereby refrigerant is removed from the cooling coils.

2. An apparatus of the class described comprising a storage tank for perishable liquids, refrigerating means connected to said tank for cooling it, said refrigerating means including cooling coils mounted in said tank and a compressor, a L.P. gas engine connected to said compressor for driving it, a control circuit, said control circuit including a source of electric power and a thermoswitch, a portion of said thermoswitch comprising a temperature-sensing element mounted inside the tank, an electrical system for the L.P. gas engine, said electrical system including a starter motor connected to said L.P. gas engine, said control circuit connecting said starter motor to said power source when said thermoswitch is closed so that the starter motor is actuated and drives the L.P. gas engine to start it whereby the refrigerating mechanism and the L.P. gas engine may be controlled by the temperature in the tank, means for automatically regulating the pressure in said cooling coils to prevent high pressure from developing in the tank when the tank is washed with hot cleaning solutions, and means for by-passing the thermoswitch to permit the L.P. gas engine and the compressor to continue to operate after the thermoswitch has opened whereby refrigerant is removed from the cooling coils.

3. An apparatus of the class described comprising a liquid storage tank, refrigerating means connected to said tank for cooling it, said refrigerating means including cooling coils mounted in said tank and a compressor, an L.P. gas engine connected to said compressor for driving it, a control circuit, said control circuit including a source of electric power and a thermoswitch, a portion of said thermoswitch comprising a temperature-sensing element mounted inside the tank, a solenoid valve connected to said cooling coils for controlling the supply of refrigerant in them, said thermoswitch controlling the solenoid valve so when the thermoswitch closes the solenoid valve opens, an electrical system for the L.P. gas engine, said electrical system including a starter motor connected to said L.P. gas engine, said control circuit connecting said starter motor to said power source when said thermoswitch is closed so that the starter motor is actuated and drives the L.P. gas engine to start it and so the solenoid valve is opened admitting refrigerant to said cooling coils whereby the refrigerating mechanism and the L.P. gas engine may be controlled by the temperature in the tank, and means for by-passing the thermoswitch and the solenoid valve to permit the L.P. gas engine and the compressor to continue to operate after the thermoswitch has opened and the solenoid valve has closed, whereby a large portion of the refrigerant is removed from the cooling coils.

4. An apparatus of the class described comprising a storage tank for perishable liquids, refrigerating means connected to said tank for cooling it, said refrigerating means including cooling coils mounted in said tank, a compressor, a condenser, and cooling fans mounted so they are directed against the condenser, a L.P. gas engine connected to said compressor for driving it, a control circuit, said control circuit including a source of electric power and a thermoswitch, a portion of said thermoswitch comprising a temperature-sensing element mounted inside the tank, a first solenoid valve connected to said cooling coils for controlling the supply of refrigerant to them, said thermoswitch controlling the first solenoid valve so that when the thermoswitch closes the first solenoid valve opens admitting refrigerant to the cooling coils, an electrical system for the L.P. gas engine, said electrical system including a starter motor connected to said L.P. gas engine and a second solenoid valve for controlling the supply of fuel to the L.P. gas engine, said control circuit simultaneously connecting said starter motor to said power source when said thermoswitch is closed and opening said second solenoid valve so that the starter motor is actuated and drives the L.P. gas engine to start it, and opening said first solenoid valve to admit refrigerant to said cooling coils whereby the refrigerating mechanism and the L.P. gas engine may be controlled by the temperature in said tank, a timer switch connected to said control circuit, said timer switch adapted to bypass the thermoswitch and control the first solenoid valve and actuate the L.P. gas engine, and the refrigerating mechanism for a predetermined period of time, a first pressure switch connected to said cooling coils and controlled by the pressure therein, said first pressure switch connected to said control circuit for by-passing the thermoswitch and the first solenoid valve to permit the L.P. gas engine and compressor to continue to operate after the thermoswitch has opened and the first solenoid valve has closed whereby the refrigerant is pumped out of the cooling coils reducing the pressure in them, said first pressure switch acting to automatically regulate the pressure in said cooling coils by closing and starting up the L.P. gas engine and compressor when the pressure in said cooling coils rises above a predetermined level, and a second pressure switch connected to the discharge lines of the compressor and controlling the operation of the cooling fans, said second pressure switch adapted to open when the pressure in the discharge lines of the compressor falls below a predetermined level whereby the cooling fans are disconnected from the source of power, and said second pressure switch adapted to close and reconnect said cooling fans to said source of power when the discharge pressure of said compressor rises above a predetermined value so that the discharge pressure of the compressor is automatically regulated independently of the temperature of the ambient air.

5. Apparatus of the class described comprising a liquid storage tank, refrigerating means connected to said tank for cooling it, said refrigerating means including cooling coils mounted in said tank and a compressor, a L.P. gas engine connected to said compressor for driving it, a control circuit including a source of electrical power and a thermoswitch, a portion of said thermoswitch comprising a temperature-sensing element mounted inside the tank, a valve connected to said cooling coils for controlling the supply of refrigerant therein, said thermoswitch controlling the valve for opening the valve in response to closing of the thermoswitch, an electrical system for the L.P. gas engine including a starter motor connected to the L.P. gas engine, said control circuit connecting said starter motor to said power source when the thermoswitch is closed so that the starter motor is actuated to drive the L.P. gas engine to start it and so the valve is opened admitting refrigerant to said cooling coils whereby the refrigerating mechanism and the L.P. gas engine may be controlled by the temperature in the tank, and means for by-passing the thermoswitch and the valve to permit the L.P. gas engine and the compressor to continue to operate after the thermoswitch has opened and the valve has closed, whereby a large portion of the refrigerant is removed from the cooling coils.

References Cited in the file of this patent

UNITED STATES PATENTS

| | | |
|---|---|---|
| 2,274,220 | Sticelber | Feb. 24, 1942 |
| 2,311,622 | Alexander et al. | Feb. 23, 1943 |
| 2,740,269 | Buehler | Apr. 3, 1956 |
| 2,847,831 | Carraway | Aug. 17, 1958 |